United States Patent
Beckman

(10) Patent No.: US 11,192,496 B2
(45) Date of Patent: Dec. 7, 2021

(54) ILLUMINATED VEHICLE PANEL AND METHOD FOR MANUFACTURING AN ILLUMINATED VEHICLE PANEL

(71) Applicant: The Boeing Company, Chicago, IL (US)

(72) Inventor: John C. Beckman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/717,682

(22) Filed: Dec. 17, 2019

(65) Prior Publication Data
US 2021/0178962 A1      Jun. 17, 2021

(51) Int. Cl.
*B60Q 3/43*        (2017.01)
*B60Q 3/78*        (2017.01)
*F21S 8/00*        (2006.01)
*B64D 11/00*       (2006.01)

(52) U.S. Cl.
CPC ............. *B60Q 3/43* (2017.02); *B60Q 3/78* (2017.02); *B64D 11/00* (2013.01); *F21S 8/03* (2013.01); *B64D 2011/0038* (2013.01); *B64D 2203/00* (2013.01)

(58) Field of Classification Search
CPC combination set(s) only.
See application file for complete search history.

(56) References Cited

U.S. PATENT DOCUMENTS

| 2008/0005981 A1* | 1/2008 | Jacobsson | E04F 15/02 52/202 |
| 2008/0253139 A1* | 10/2008 | Stokes | A62B 3/00 362/471 |
| 2009/0059609 A1* | 3/2009 | Marshall | F21K 9/00 362/470 |
| 2014/0175488 A1* | 6/2014 | Kashiwagi | H01L 33/501 257/98 |
| 2018/0272931 A1* | 9/2018 | Salter | B60Q 3/68 |

* cited by examiner

*Primary Examiner* — Rajarshi Chakraborty
*Assistant Examiner* — Nathaniel J Lee
(74) *Attorney, Agent, or Firm* — McDonnell Boehnen Hulbert & Berghoff LLP

(57) ABSTRACT

A method for manufacturing a panel includes forming a path segment on a surface of a substrate from a photoluminescent material. The method further includes overlaying the path segment with an overlay material. The overlay material is configured to render the path segment substantially invisible under an ambient photopic condition and render the path segment visible under an ambient mesopic or scotopic condition.

20 Claims, 14 Drawing Sheets

Fig. 10C                                    Fig. 10D

ILLUMINATED VEHICLE PANEL AND METHOD FOR MANUFACTURING AN ILLUMINATED VEHICLE PANEL

FIELD

This application generally relates to interior decorations of vehicles. In particular, this application describes an illuminated vehicle panel and a method for manufacturing an illuminated vehicle panel.

BACKGROUND

Airline operators may go to various lengths to improve brand recognition and customer experience. For example, in an effort to improve brand recognition, an operator may order aircraft from a manufacturer and specify in the order that the exterior of all aircraft ordered depict a logo or that all aircraft be painted a particular color. Specifying logos and colors may be especially true where the logo and/or colors have come to be associated with the operator.

In an effort to improve customer experience, the operator may specify that the interior of the aircraft be decorated in a pleasing manner and/or that the interior of the aircraft includes certain amenities desired by the operator's passengers. For example, the operator may specify the arrangement of the seats, the fabrics used throughout the cabin, and various colors and designs to depict within the aircraft.

SUMMARY

An example of a method for manufacturing a panel includes forming a path segment on a surface of a substrate from a photoluminescent material. The method further includes overlaying the path segment with an overlay material. The overlay material is configured to render the path segment substantially invisible under an ambient photopic condition and render the path segment visible under an ambient mesopic or scotopic condition.

An example of a panel for an interior cabin of an aircraft includes a substrate. A path segment is arranged on a surface of the substrate. The path segment is formed from a photoluminescent material. An overlay material is arranged on the path segment. The overlay material is configured to render the path segment substantially invisible under an ambient photopic condition and render the path segment visible under an ambient mesopic or scotopic condition.

An example of an aircraft includes a plurality of panels configured for attachment to an interior of a fuselage. At least one panel of the plurality of panels includes a substrate, a path segment, and an overlay material. The path segment is arranged on the surface of the substrate. The overlay material is arranged on the path segment. The overlay material is configured to render the path segment substantially invisible under an ambient photopic condition and render the path segment visible under an ambient mesopic or scotopic condition.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

FIG. 10C illustrates a left-side view thereof.

FIG. 10D illustrates a right-side view thereof.

DETAILED DESCRIPTION

Figure 1A:
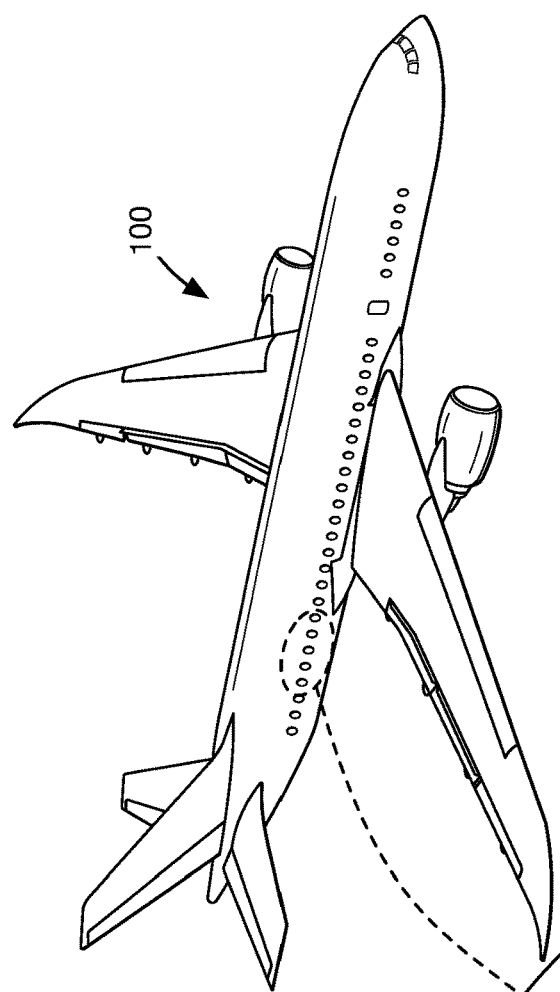
FIG. 1A illustrates an aircraft, in accordance with an example.

Various examples of systems, devices, and/or methods are described herein. Words such as "example" and "exemplary" that may be used herein are understood to mean "serving as an example, instance, or illustration." Any implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those of ordinary skill in the art, may occur in amounts that do not preclude the effect the characteristic was intended to provide.

Introduction

As noted above, in an effort to improve customer experience, aircraft operators may specify that the interior of the aircraft be decorated in a particularly pleasing manner and/or that the interior of the aircraft include certain amenities. The examples disclosed herein describe a panel for the interior of an aircraft that includes photoluminescent graphics and a method for manufacturing the panels. While the examples herein are described in connection with aircraft, the examples can be applied to other types of vehicles such (e.g., cars, ships, trains). Additionally, the examples can be applied to non-vehicular structures such as signage, billboards, walls, etc. In some examples, the graphics correspond to asterisms and/or constellations. As used herein, the term asterism refers to a popularly known pattern or group of stars that can be seen in the night sky. The term constellation refers to a group of stars that forms an imaginary outline or pattern on the celestial sphere such as an animal, mythological person or creature, a god, or an inanimate object. In some other examples, the graphics can correspond to any shape or figure that passengers may find pleasing.

A combination of photoluminescent path segments arranged on the panel and illuminating openings formed therein can be utilized to depict the respective frames and stars of the asterisms and constellations. During the flight, the pilot or cabin attendant of the aircraft may dim the ambient lighting in the cabin and activate the illumination devices so that the asterisms and/or constellations become visible to the passengers. For example, the cabin attendant may press a button at a cabin attendant panel (CAP) of the aircraft, which may trigger an automated process of setting the cabin ambient lighting to the particular phase of flight at hand, for example, a sleep phase. A cabin services system (CSS) in communication with the CAP may communicate signals to the cabin lighting system of the aircraft to create a particular dynamic scene. As the cabin lights dim, the CSS may control the illumination devices to brighten, and the asterisms and/or constellations may subsequently become visible to the passengers.

The sudden appearance of the asterisms and/or constellations may give passengers a sense of wonder and improve the passenger experience. Additionally, rendering the asterisms and/or constellations visible during certain periods of the flight can be utilized to indicate the status of the flight. For example, the asterisms and/or constellations can be made visible when the aircraft is within one hour of landing. Passengers that frequently utilize the operator's aircraft may come to associate the rendering of the asterisms and/or constellations with the aircraft being close to its final destination.

Figure 1B:
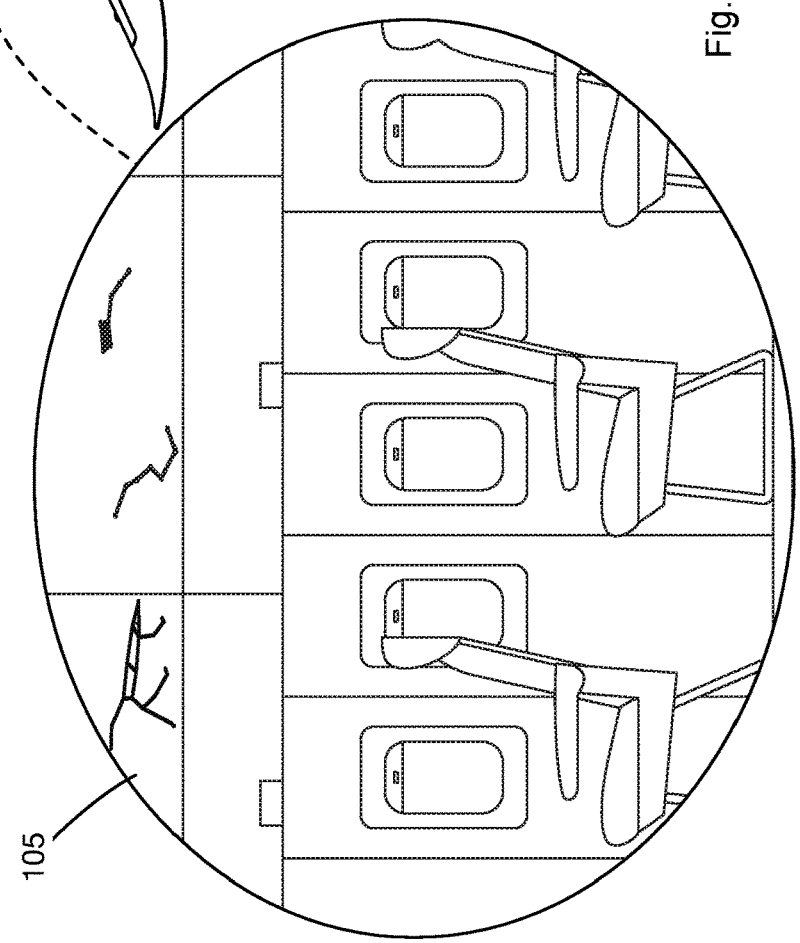
FIG. 1B illustrates an interior section of the aircraft, in accordance with an example.

FIG. 1A illustrates an aircraft 100. FIG. 1B illustrates an interior section of the aircraft, in accordance with an example. The aircraft 100 includes a plurality of panels 105 configured for attachment to an interior of a fuselage of the aircraft 100. An example of the aircraft 100 can correspond to a large commercial passenger jet. The panels 105 can be arranged in a passenger section of the aircraft 100. The panels 105 can be arranged on the ceiling and/or overhead compartments of the passenger section of the aircraft 100. It should be noted that while the panels 105 are described herein in connection with a commercial passenger jet, examples of the panel can be adapted for use in other types of vehicles. For example, the panels can be utilized in buses, trains, and ships. The panels 105 can be used in other environments.

Figure 2A:
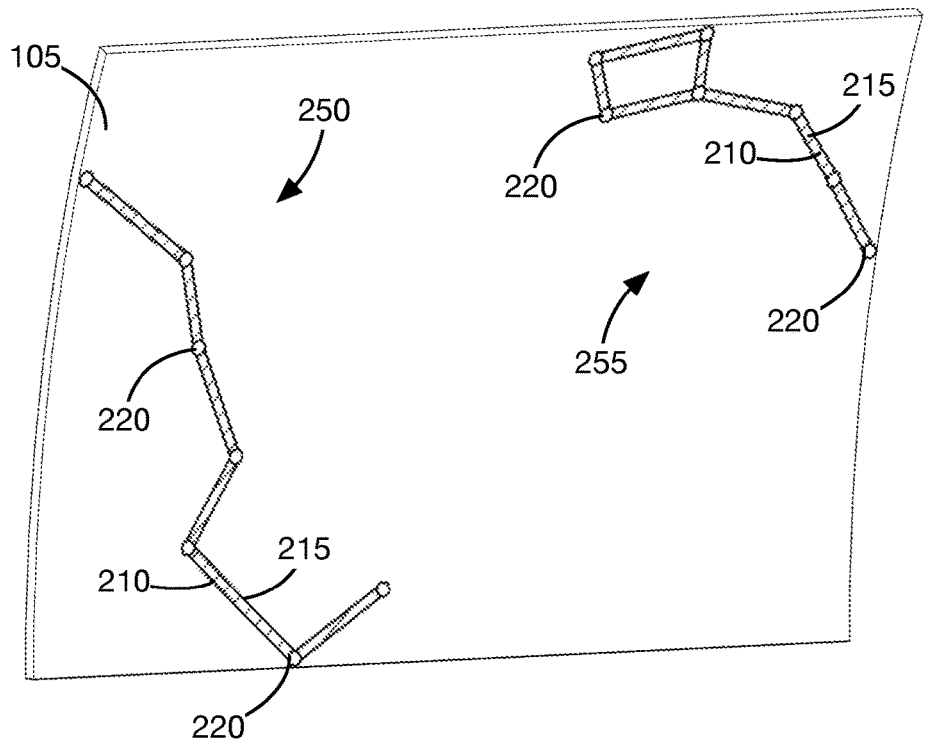
FIG. 2A illustrates a top view of a panel for an interior cabin of the aircraft, in accordance with an example.
Figure 2B:
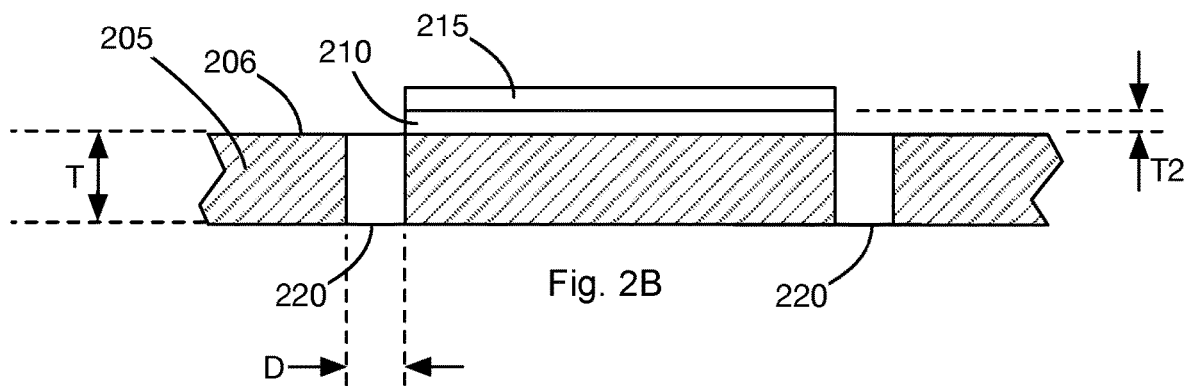
FIG. 2B illustrates a side view of the panel, in accordance with an example.

FIG. 2A illustrates a more detailed rendering of a panel 105 that can correspond to one or more panels of the cabin of the aircraft 100. FIG. 2B illustrates a side view of a portion of the panel 105. Referring to the figures, the panel 105 includes a substrate 205, a path segment 210, and an overlay material 215. The path segment 210 is arranged on a surface 206 of the substrate 205. The path segment 210 is formed from a photoluminescent material. The overlay material 215 is arranged on the path segment 210. The overlay material 215 is configured to render the path segment 210 substantially invisible under an ambient photopic condition (i.e., luminance levels of 10 to $10^8$ $cd/m^2$) and render the path segment 210 visible under an ambient mesopic (i.e., luminance levels of 0.001 to 3 $cd/m^2$) or scotopic condition (i.e., luminance levels of $10^{-3}$ to $10^{-6}$ $cd/m^2$). The luminance levels above can correspond to the luminance levels measured in proximity to passenger seating, which can be measured by an optical power and wavelength meter manufactured by, for example, GL Optic. A different example of the overlay material 215 can be configured to render the path segment 210 substantially invisible under luminance levels different from those associated with the ambient photopic condition levels, and visible under luminance levels different from those associated with the ambient mesopic and/or scotopic conditions levels.

An example of the substrate 205 can correspond to a ridged material. For example, the substrate 205 can include a honeycomb core such as a Nomex® honeycomb core. The honeycomb core can be faced with, for example, one or two skin plies of glass/phenolic prepreg. In some implementations, the substrate 205 can be formed via a "Crush core" process. Such a process facilitates forming substrates having curved shapes and consistent thicknesses, which ensures a good fit and finish during installation. In this regard, an example of the substrate 205 can be formed to have a thickness, T, of about 0.5-inch thick, with a 0.12-inch cell size. An example of the substrate 205 can be formed to have dimensions of about be about 4 ft by 8 ft. An example of the substrate 205 can have a curved shaped configured to follow the contour of the interior of the cabin of the aircraft 100. Other examples of the substrate 205 can be formed to have different thickness, dimensions and/or shapes.

Figure 2C:
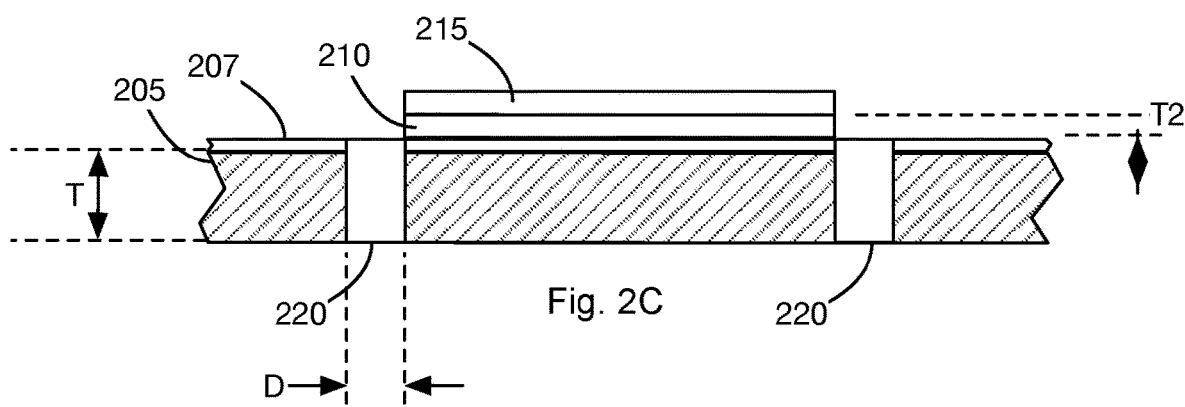
FIG. 2C illustrates a side view of a panel that includes a film layer, in accordance with an example.

As illustrated in FIG. 2C, in some examples, the substrate 205 can include a decorative film layer 207, and the film layer 207 can be disposed over the face material of the substrate 205. An example of the film layer 207 can include one or more layers of printed and/or textured films and a protective layer. Another example of the film layer 207 can correspond to a polyvinyl fluoride (PVF) film such as Tedlar®. The film layer 207 can be fixed to the substrate 205 with an adhesive such as an epoxy adhesive, a phenolic adhesive, or a polyurethane adhesive.

As noted above, the path segment 210 is arranged on the surface 206 of the substrate 205. The path segment 210 is formed from a photoluminescent material. One example of the photoluminescent material can correspond to a phosphorescent material. Phosphorescent materials do not immediately discharge all the radiation they absorb. Rather, phosphorescent materials discharge radiation at a lower intensity for up to several hours after initial excitation. In this regard, one example of the path segment 210 can, for example, discharge radiation at a luminosity level of at least 0.041 $cd/m^2$ for at least 1 hour. These discharges can occur in different dominant emission wavelengths such as in the violet region (380-450 nm), the green blue region (490-560 nm), the blue region (450-450 nm), and the red region (635-700 nm) of the electromagnetic spectrum. In some examples, the discharges can occur in different emission wavelengths regions.

One example of the photoluminescent material can correspond to a mixture that includes strontium aluminate ($SrAl_2O_4$) and an adhesive such as a water based acrylic medium. One example of a water based acrylic medium includes a mixture of a gloss medium by Liquitex®, a varnish, and an alkyd. One example of the alkyd is a polyester resin such as Liquin® manufactured by Winsor & Newton®. In this regard, the photoluminescent material can discharge light in the 490-520 nm range. The wavelength can be measured using an optical power and wavelength meter manufactured by, for example, GL Optic. In some examples of the photoluminescent material, the chemistry can be altered so that the photoluminescent material discharges light in the violet range (<490 nm). For example, the chemistry can be altered by utilizing different phosphorescent materials in different combinations such as strontium, magnesium, calcium, barium, silicon, or titanium. In some cases, alkaline earth metals can be added with fluorescent pigments. Table 1 lists other example phosphor/dopant combinations from which the photoluminescent material can be derived along with the color of light discharged by each combination.

TABLE 1

| Phosphor:Dopant | Perceived Color (Wavelength) |
| --- | --- |
| SrAl2O4:Eu, Dy | green (510-525 nm) |
| Sr4Al14O25:Eu, Dy | blue green (407-494 nm) |
| Sr2MgSi2O7:Eu, Dy | blue green (456 nm) |
| Y2O2S:Eu, Mg, Ti | light red (620 nm) |
| CaAl2O4:Eu, Nd | violet (440-450 nm) |
| CaS:Eu, Tm | light red (640 nm) |
| ZnS:Cu, Mn, Co | yellow orange (515-560 nm) |
| ZnS:Cu, Ce | yellow green (460-560 nm) |

An example of the photoluminescent material can be configured to produce a particular luminosity level. In this regard, the photoluminescent material can correspond to a mixture that includes strontium aluminate, an adhesive, and a dopant. An example of the dopant can correspond to europium (Eu). The addition of the dopant facilitates trapping the photons in an excited state.

In some cases, the particle size of the photoluminescent material is selected to produce a particular luminosity. For example, a photoluminescent material having a large average particle size (e.g., >160 microns) can discharge light at a luminosity of about 0.25 $cd/m^2$ for at least 20 minutes. The particle size can be determined using, for example, a particle size analyzer (PSA) which can be configured to determine the particle size of a substance via high definition image processing, analysis of Brownian motion, gravitational settling of the particle and/or light scattering (Rayleigh and Mie scattering) of the particles. A photoluminescent material having small average particle size (e.g., 25 microns) can discharge light at a luminosity of about 0.10 $cd/m^2$ for at least 20 minutes.

In some instances, the thickness, T2, of the photoluminescent material can be selected to produce a particular luminosity level. For example, a nominal thickness, T2, of 300-400 microns can result in a photoluminescent material having a luminosity of greater than 0.4 $cd/m^2$. A thicker layer of photoluminescent material can have a greater luminosity. Thus, the thicker the photoluminescent material, the easier it can be for a passenger to see a pattern formed from the photoluminescent material under a particular lighting condition in the aircraft cabin.

One issue with forming the path segment 210 from a material that includes $SrAl_2O_4$ is that the path segment 210 can tend to have a pale yellow color in daylight. In this case, any shape defined by the path segment 210 can be slightly visible to the naked eye under ambient daylight conditions. The overlay material 215 discussed above can be arranged on the path segment 210 to mask and/or alleviate this issue.

The overlay material 215 is configured to facilitate the observation of light discharged from the path segment 210 under darkened conditions and to mask the pale yellow color of the path segment 210 under daylight conditions. More specifically, the overlay material 215 is configured to render the path segment 210 substantially invisible under an ambient photopic condition (i.e., luminance levels of 10 to $10^8$ $cd/m^2$) and to render the path segment 210 visible under an ambient mesopic (i.e., luminance levels of 0.001 to 3 $cd/m^2$) or scotopic condition (i.e., luminance levels of $10^{-3}$ to $10^{-6}$ $cd/m^2$). In this regard, the overlay material 215 is further configured to allow blue wavelengths to pass through the overlay material 215 to facilitate charging the photoluminescent material, and to facilitate the discharge of, for example, blue or green emissions under ambient mesopic or scotopic conditions. One example of an overlay material 215 with these characteristics is a bandpass filter film such as a Delta continuously variable bandpass filter film.

As noted above, the overlay material 215 can be arranged on the path segment 210. In some cases, an adhesive can be utilized to fix the overlay material 215 to the path segment 210. An example of the overlay material 215 can have the same dimensions as the path segment 210. For example, the overlay material 215 can have the same length and width as a particular path segment 210 covered by the overlay material 215. In cases, where the sides of the path segment 210 can otherwise be exposed to ambient light, the overlay material 215 can be dimensioned to cover the entire surface of the path segment 210 and the sides of the path segment 210 so that no portion of the path segment 210 is directly exposed to ambient light.

An example of the panel 105 can include one or more openings 220 formed in the substrate 205. The path segment 210 can linearly extend between a pair of openings 220. An example of the opening 220 can extend through the entire substrate 205. The opening 220 can have a circular shape, a square shape, or a different shape. In the case of a circular shape, in some example, the opening 220 can have a diameter, D, of about 1 mm (e.g., when a fiber optic cable is arranged in the opening). In a different example, the opening 220 can have a diameter, D, of 3-4 mm (e.g., when an LED is arranged in the opening).

Figure 3A:
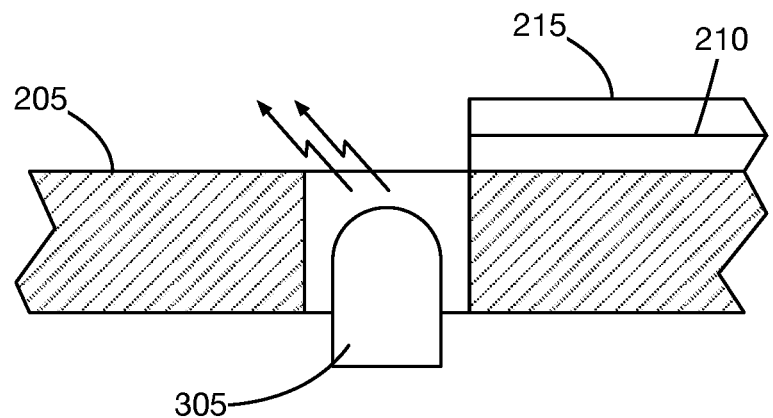
FIG. 3A illustrates a panel with an illumination device arranged in an opening of the panel, in accordance with an example.

FIG. 3A illustrates an example of a panel 105 with an illumination device 305 arranged in an opening 220 of the substrate 205 of the panel 105. The illumination devices 305 can help accentuate the intersections between path segments 210, which in turn can allow a passenger to more easily identify a particular shape defined by the path segments 210. The illumination device 305 is configured to emit light that then passes through the opening 220. Examples of illumination devices 305 include light-emitting diodes (LEDs) and incandescent bulbs. While the illumination device 305 is illustrated as being within the opening 220, in other examples of the panel 105, the illumination device 305 can be arranged proximate to the opening 220. For example, the illumination device 305 can be arranged below the substrate 205 or can protrude through the opening 220 to an extent.

The illumination device 305 can be electrically connected to a controller (not shown) configured to generate a voltage to power the illumination device 305. An example of the controller can correspond to the above-referenced cabin services system (CSS). The controller can be configured to adjust the brightness of the illumination device 305 responsive to a command from the pilot of the aircraft 100.

Figure 3B:
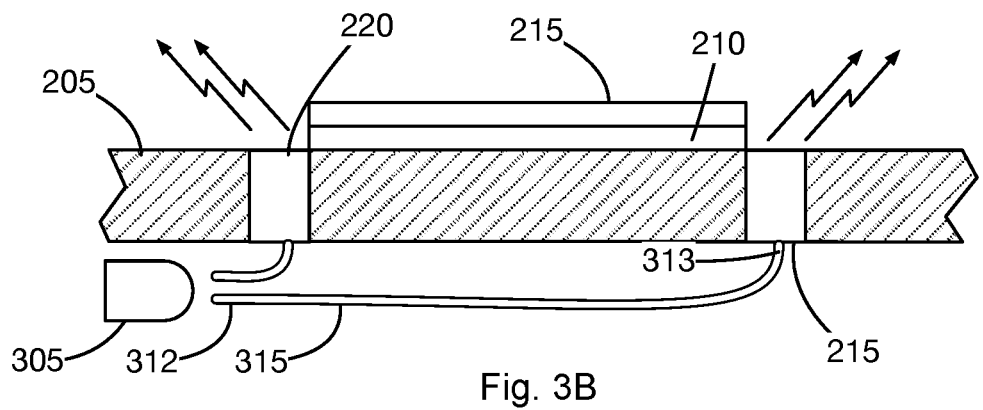
FIG. 3B illustrates a panel that utilizes a fiber optic cable to optically communicate light emanating from an illumination device to an opening, in accordance with an example.

FIG. 3B illustrates an example of a panel 105 that utilizes a group of fiber optic cables 315 to optically distribute light emitted from an illumination device 305 to a group of openings 220 in the substrate 205. For example, twenty fiber optic cables 315 can distribute light emitted from a single illumination device 305 to twenty different openings 220. A different numbers of fiber optic cables 315 can distribute light emitted from one or more illumination devices 305 to a different number of openings 220. The illumination device 305 can be arranged on or below a side of the substrate 205 opposite the path segment 210. First ends 312 of the fiber optic cables 315 can be arranged in proximity to the illumination device 305 and second ends 313 of the fiber optic cables 315 can be arranged within or proximate to different openings 220 formed in the substrate 205. In some examples of the panel, the illumination device 305 and the fiber optic cables 315 can be fixed to the bottom surface of the substrate 205 with, for example, an adhesive.

Figure 3C:
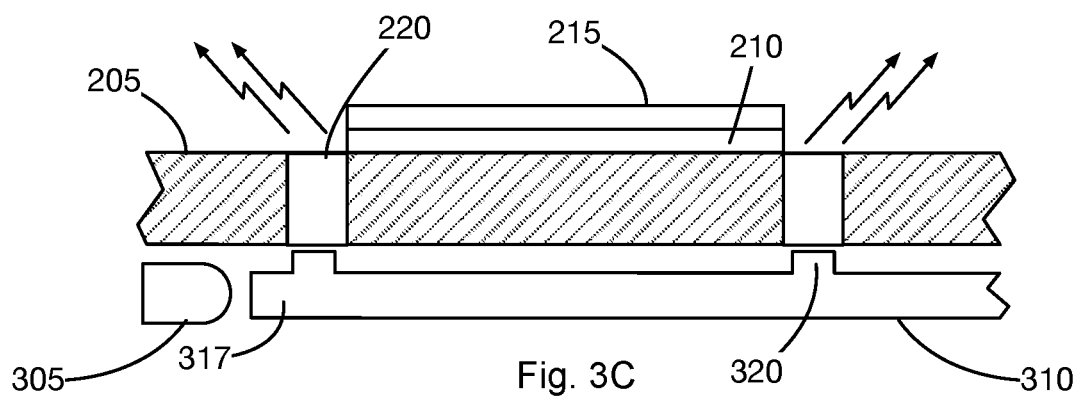
FIG. 3C illustrates a panel that utilizes a light pipe to optically communicate light emanating from an illumination device to an opening, in accordance with an example.

FIG. 3C illustrates an example of a panel 105 that utilizes a light pipe 310 to optically distribute light emitted from an illumination device 305 to a group of openings 220 in the substrate 205. For example, the light pipe 310 can define twenty different pathways. The pathways can distribute light emitted from a single illumination device 305 to twenty different openings 220. The illumination device 305 can be arranged on or below a side of the substrate 205 opposite the path segment 210. The light pipe 310 can have a first end 317 arranged in proximity to the illumination device 305 and one or more pipe terminals 320 arranged within or proximate to different openings 220 formed in the substrate 205. In some examples of the panel, the illumination device 305 and the light pipe 310 can be fixed to the bottom surface of the substrate 205 with, for example, an adhesive.

In an example of the panel 105, rather than forming openings in the substrate 205, a circuit (not shown) that includes one or more illumination devices 305 (e.g., LEDs) can be printed on the top of the substrate 205. Printing the circuit can be more cost effective than forming the openings. The illumination devices 305 can be arranged at locations corresponding to endpoints of the path segments 210. The circuit can then be overlaid by the film layer 207 (e.g., Tedlar®), and light emitted from the illumination devices 305 can be seen through the film layer 207. As noted above, illumination devices 305 can help accentuate the intersections between path segments 210, which in turn can allow a passenger to more easily identify a particular shape defined by the path segments 210.

Referring back to FIG. 2A, an example of the panel 105 can have a group of path segments 210 and openings 220 arranged in a recognizable shape. For example, the shape can correspond to an asterism (250 and 255) (i.e., a popularly known pattern or group of stars that can be seen in the night sky). Under darkened conditions, the openings 220 can be illuminated by the illumination device 305 to represent the stars of the asterism, and light emitted from photoluminescent material of the path segments 210, arranged between the openings, can be visible. The combined illuminated openings 220 and visible path segments 210 depict the asterism (250 and 255). Within examples, the asterism 250 represents The Big Dipper and the asterism 255 represents The Little Dipper as illustrated in FIG. 2A. Other asterisms can be represented by various combinations of illuminated openings 220 and path segments 210. A non-exhaustive list of internationally recognized asterisms that can be represented by particular arrangements of openings 220 and path segments 210 includes the Summer Triangle, the Great Square of Pegasus, the Sickle of Leo, the Diamond Ring, the Coathanger.

Figure 4:
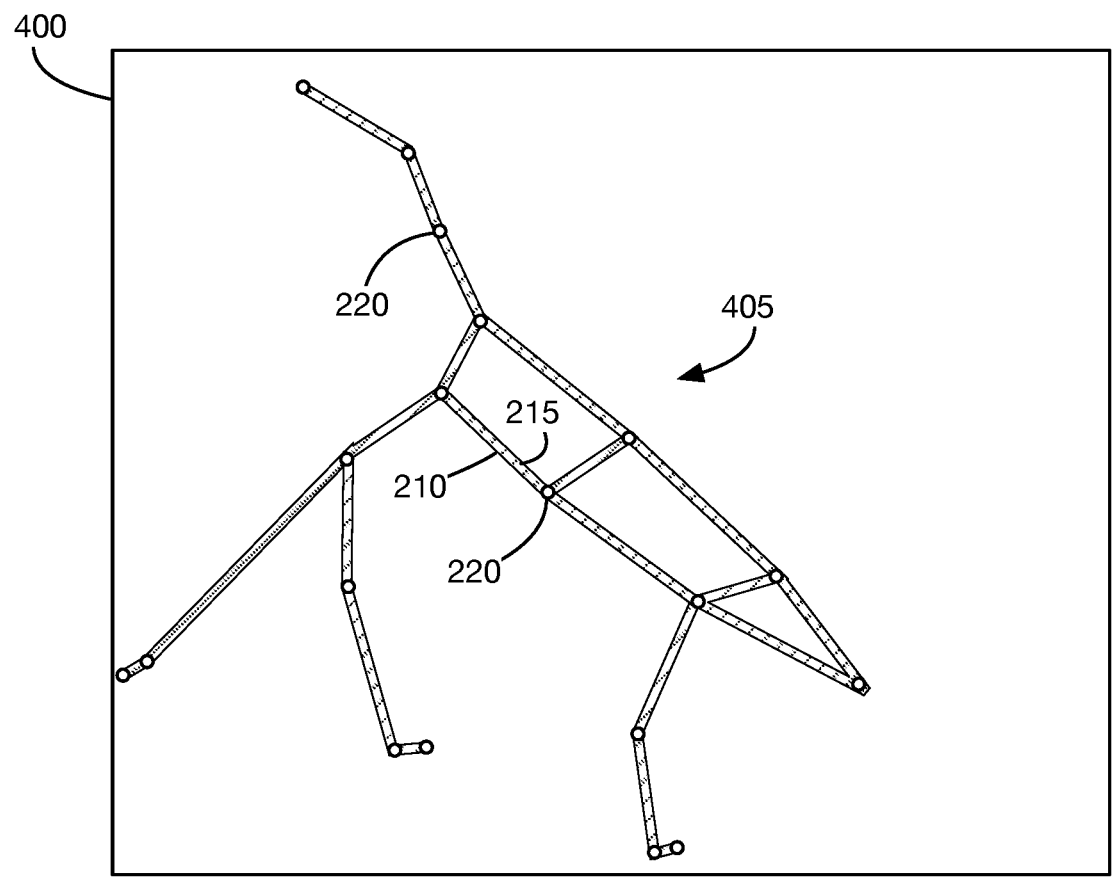
FIG. 4 illustrates a view of panel depicting the shape of a constellation, in accordance with an example.

FIG. 4 illustrates an example of a panel 400 depicting the shape of a constellation 405. The constellation 405 corresponds to Ursa Major, as seen by the naked eye. Under darkened conditions, the openings 220 can be illuminated by the illumination device 305 to represent the stars of the constellation 405 and the light emitted from the photoluminescent material of the path segments 210 arranged between the openings can be visible. The combined illuminated openings 220 and visible path segments 210 depict the constellation 405. A non-exhaustive list of internationally recognized constellations 405 that can be represented by particular arrangements of openings 220 and path segments 210 includes Aquarius, Aquila, Aries, Canis Major, Cassiopeia, Cygnus, Gemini, Leo, Lyra, Ursa minor, Wheat of Virgo, and Orion.

In some cases, less well known but regionally significant constellations can be represented by particular arrangements of openings 220 and path segments 210. For example, a non-exhaustive list of constellations 405 known to inhabitants of the islands of the Pacific that can be represented by particular arrangements of openings 220 and path segments 210 includes Ke Ka o Makali'i ("The Canoe-Bailer of Makali'i"), Iwikuamo'o ("Backbone"), Manaiakalani ("The Chief s Fishline"), and Ka Lupe o Kawelo ("The Kite of Kawelo"). Other constellations 405 known to inhabitants of other regions of the world can be represented. For example, constellations known to the inhabitants of Asia, Europe, and Africa can be represented.

In yet other examples, the substrate can include a plethora of openings 220 and the illumination devices 305 utilized to illuminate the openings 220 can be dynamically activated to show various combinations of patterns via the openings 220. A computer can control the illumination devices 305 to activate according to, for example, a location of the aircraft, and predefined patterns.

As noted above, illuminated openings 220 and photoluminescent path segments 210 can be arranged in a myriad of patterns or any other image or shape to depict any shape or pattern. For example, the shape can correspond to a cartoon character. The shape can correspond to a company logo. The shape can correspond to a word or phrase. The shape can correspond to other images or shapes.

Figure 5:
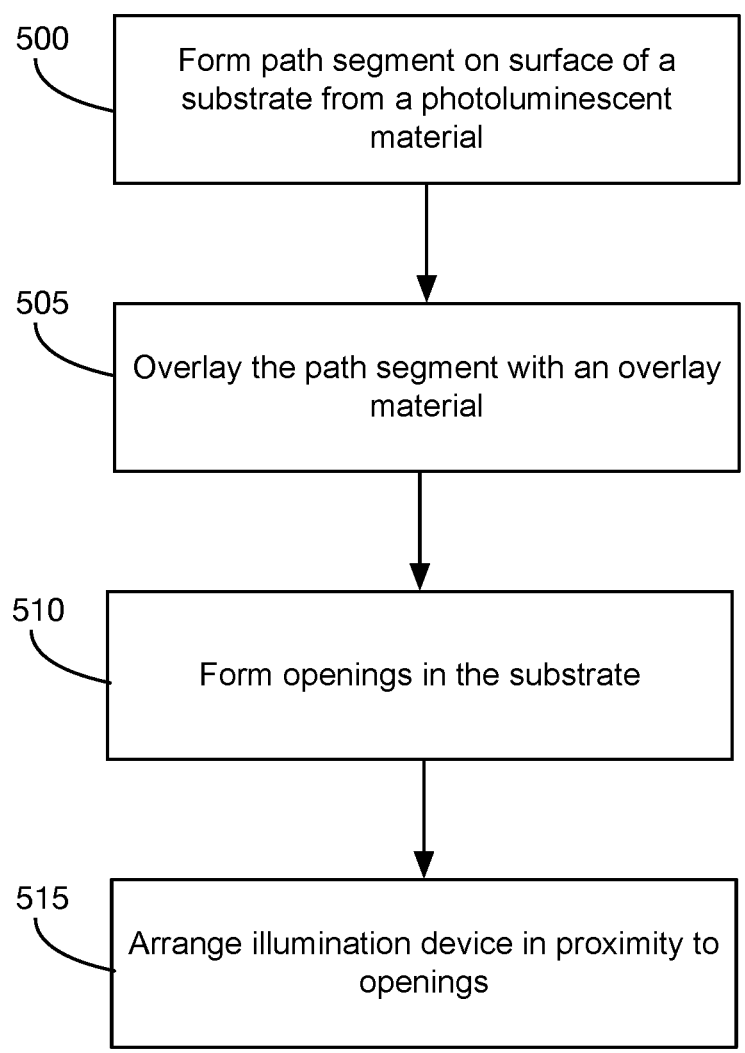
FIG. 5 illustrates a method for manufacturing the panel of FIG. 1B, in accordance with an example.
Figure 6A:
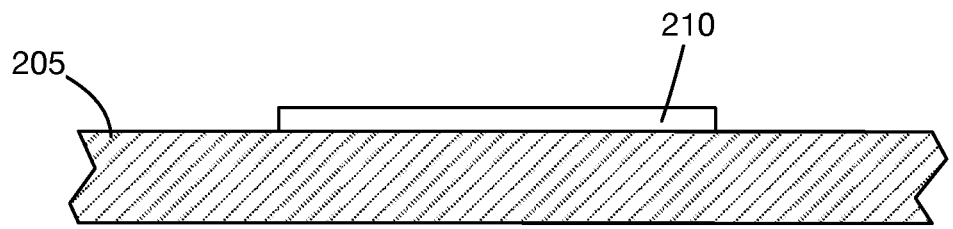
FIG. 6A illustrates a path segment formed on a surface of a substrate from a photoluminescent material, in accordance with an example.

FIG. 5 illustrates an example of a method for manufacturing the panel 105 of FIG. 1B. Block 500 involves forming a path segment 210 on a surface 206 of a substrate 205 from a photoluminescent material, as illustrated in FIG. 6A.

The substrate 205 can correspond to a conformed rigid material such as a Nomex® honeycomb core. The honeycomb core can be faced with, for example, one or two skin plies of glass/phenolic prepreg. The substrate 205 can have a thickness, T, of about 0.5-inch thick, with a 0.12-inch cell size, and can have a surface area of about be about 4 ft by 8 ft. One or more layers of printed, textured, and/or protective film layers such as printed, textured, and/or protective film layers formed from a material such as Tedlar® can be attached to the substrate 205 with, for example, an adhesive.

An example of the photoluminescent material corresponds to a mixture that comprises strontium aluminate and an adhesive. A different example of the photoluminescent material can correspond to a mixture that comprises strontium aluminate, an adhesive, and a dopant. The photoluminescent material can, for example, discharge radiation at a luminosity level of at least 0.2 cd/m$^2$ for at least 30 minutes. The thickness, T2 of the photoluminescent material can be selected to produce a desired luminosity level. For example, a thickness, T2, of 300-400 microns can result in a photoluminescent material having a luminosity of greater than 0.4 cd/m$^2$. A thicker layer of photoluminescent material can have a greater luminosity.

An example of forming the path segment 210 involves a masking process. For example, a mask can be arranged on the surface 206 of the substrate 205. The mask can define one or more cut-outs having particular shapes at locations associated with particular path segments 210. For example, the shape of the cut-out (i.e., length and width) can match the length and width of a particular path segment 210. An example of the mask can have a thickness that matches the desired thickness of the path segment 210. For example, the thickness of the mask can correspond to the desired thickness, T2, of the path segment 210.

After arranging the mask on the surface 206 of the substrate 205, the photoluminescent material can be applied over the mask. In this regard, the photoluminescent can be in an uncured state. For example, the photoluminescent material can be in a liquid or gel state. The photoluminescent material can be spread evenly over the mask by a wiping operation.

After applying the photoluminescent material, the mask can be removed, and the photoluminescent material can be allowed to cure. Some examples of the photoluminescent material can cure in the presence of air or via a chemical reaction. The curing time of an example of the photoluminescent material can be reduced by heating the photoluminescent material. In some instances, the operations above can be repeated to build up successive layers of photoluminescent material to facilitate increasing the thickness of the photoluminescent material.

Another example for forming the path segment 210 involves depositing the photoluminescent material onto the surface 206 of the substrate 205. For example, the photoluminescent material can be provided in a liquid state. The liquid photoluminescent material can be sprayed/printed onto the substrate 205 via a nozzle. The nozzle can be movable relative to the substrate 205 according to two degrees of freedom. In this regard, a computer can control the relative movement of the nozzle and the opening and closing of the nozzle to deposit the photoluminescent material. For example, the substrate 205 can be arranged on an X-Y table. The computer can control the X-Y table to move the substrate 205 under the nozzle and can control the nozzle to open and close in particular regions to form the path segments 210 on the substrate 205.

Another example for forming the path segment 210 involves utilizing a printing process, such as a silkscreen printing process, for example, to apply the photoluminescent material to the substrate 205. In silkscreen printing, an emulsion is spread over a screen and selectively cured with a negative of the desired pattern of the path segment 210. The uncured parts of the emulsion are washed off the screen leaving openings in the mesh of the screen in locations corresponding to the path segment 210. The photoluminescent material can then be spread on to the screen to fill the openings in the mesh of the screen associated with the path segment 210. The screen can then be pressed onto the substrate 205. Capillary pressure draws the photoluminescent material from the openings of the mesh to the surface 206 of the substrate 205. The screen can then be removed, leaving behind photoluminescent material having a pattern of the path segment 210. The photoluminescent material can then be cured (e.g., air dried, chemically cured, UV cured, etc.).

In some instances, the operations above can be repeated to build up successive layers of photoluminescent material to facilitate increasing the thickness of the photoluminescent material.

In the case of a panel 105 having a film layer 207 on the substrate 205 (See FIG. 2C), an example for forming the path segment 210 can involve utilizing any of the above techniques to form the path segment 210 on the film layer 207 of the substrate 205 before applying the film layer 207 to the substrate 205. One example of this method involves providing the film layer 207 as a roll of film and utilizing a printer to deposit the photoluminescent material on to the roll of film. Afterward, the photoluminescent material can be cured as described above. The film roll can then be cut to a desired size and shape and applied to the substrate 205, as described above.

Figure 6B:
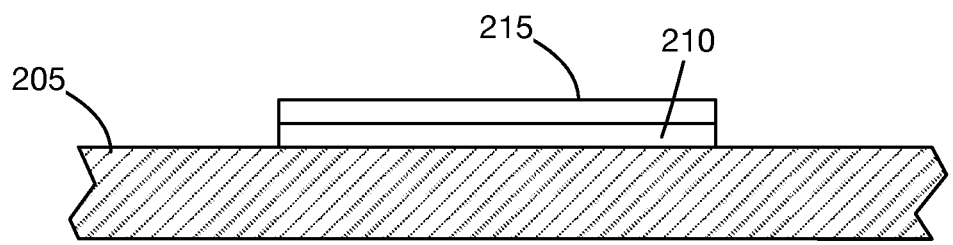
FIG. 6B illustrates an overlay material overlaying the path segment, in accordance with an example.

Block 505 involves overlaying the path segment 210 with an overlay material 215, as illustrated in FIG. 6B. As noted above, one issue with forming the path segment 210 from a photoluminescent material such as SrAl$_2$O$_4$ is that the path segment 210 can tend to have a pale yellow color under an ambient photopic condition (i.e., luminance levels of 10 to 10$^8$ cd/m$^2$). The overlay material 215 is configured to render the path segment 210 substantially invisible under an ambient photopic condition and render the path segment 210 visible under an ambient mesopic or scotopic condition (i.e., luminance levels of 10$^{-3}$ to 10$^{-6}$ cd/m$^2$).

One example of the overlay material 215 can correspond to the light enhancement film described above. In this case, the overlay material 215 can be configured to allow sufficient blue wavelengths to pass through the overlay material 215 to facilitate charging the photoluminescent material, and to facilitate viewing the discharge of blue or green emission from the photoluminescent material under in the mesopic or scotopic condition conditions.

The overlay material 215 can be cut into the shape of the path segment 210 so that the overlay material 215 has the same general dimensions as the path segment 210. To prevent exposure of the edges of the path segment 210 to ambient light, the overlay material 215 can be dimensioned to cover the entire exposed surface of the path segment 210 so that no portion of the path segment 210 is directly exposed to ambient light.

After cutting the overlay material 215 into the desired shape, the shaped overlay material 215 can be fixed to the top of the path segment 210. For example, the shaped overlay material 215 can be adhered to the top of the path segment 210 with an adhesive such as the water based acrylic medium described above.

Another example of the overlay material 215 can correspond to a thin layer of a translucent material having a color that matches the background of the panel 105. For example, in the case of a panel 105 having a white background, the overlay material 215 can correspond to a white translucent material or a different color that, when combined with the pale yellow color of the photoluminescent material, renders the path segment 210 invisible to the naked eye under daylight conditions. The overlay material 215 can have a thickness smaller than 500 µm, smaller than 250 µm, and even smaller than 100 µm. The overlay material 215 can be applied to the path segment 210 by utilizing any of the depositing techniques described above. For example, the overlay material 215 can be applied over the path segment 210 via a masking process, deposition process, or a silkscreen process.

Figure 6C:
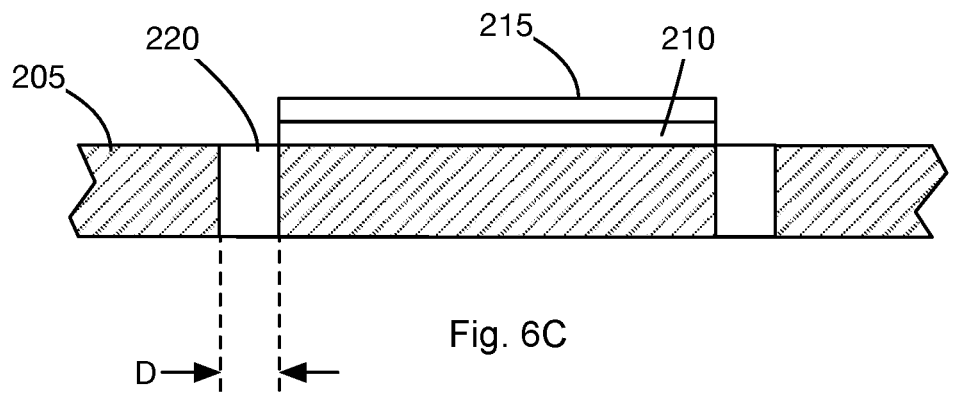
FIG. 6C illustrates openings formed in the substrate, in accordance with an example.

Block 510 involves forming openings 220 in the substrate 205, as illustrated in FIG. 6C. Some examples for forming the openings 220 in the substrate 205 can involve drilling the openings 220 into the panel 105 with a drill bit or laser or forming the substrate 205 in a mold that defines the openings 220 in the substrate 205. The openings 220 can extend through the entire substrate 205. The openings 220 can have a circular shape, a square shape, or a different shape. In the case of a circular shape, in some example, the opening 220 can have a diameter, D, of about 1 mm (e.g., when a fiber optic cable is arranged in the opening). In a different example, the opening 220 can have a diameter, D, of 3-4 mm (e.g., when an LED is arranged in the opening).

Block 515 involves arranging an illumination device 305 within the openings 220 formed in the substrate 205, as illustrated FIGS. 3A-3C. As noted above, the illumination device 305 can correspond to a light-emitting diode (LED) or an incandescent bulb. The illumination device 305 can be arranged within the opening 220 or proximate to the opening (e.g., just below the opening 220, or protruding from the opening 220). The illumination device 305 can be arranged on or below a side of the substrate 205 opposite the path segment 210, and a light pipe 310 or fiber optic cable 315 can be utilized to optically distribute light emitted from the illumination device 305 to groups of openings 220.

Figure 7:
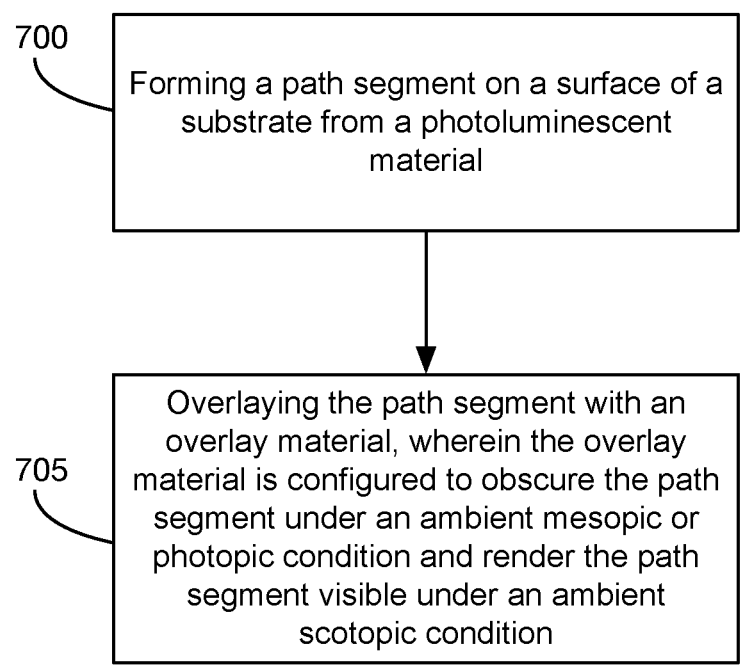
FIG. 7 illustrates a method for manufacturing a panel, in accordance with an example.

FIG. 7 illustrates another example of a method for manufacturing a panel 105. Block 700 involves forming a path segment 210 on a surface 206 of a substrate 205 from a photoluminescent material.

Block 705 involves overlaying the path segment 210 with an overlay material 215, wherein the overlay material 215 is configured to render the path segment 210 substantially invisible under an ambient photopic condition and render the path segment 210 visible under an ambient mesopic or scotopic condition.

Some examples of the method can involve forming two or more openings 220 in the substrate 205, wherein the path segment 210 linearly extends between a pair of the two or more openings 220 of the plurality of openings 220; and arranging one or more illumination devices 305 in proximity to the two or more openings 220 to illuminate endpoints of the path segment 210.

In some examples, arranging one or more illumination devices 305 can involve arranging a fiber optic cable 315 in proximity to the two or more openings 220.

In some examples, arranging one or more illumination devices 305 can involve arranging a light-emitting diode (LED) in proximity to the two or more openings 220.

Some examples of the method can involve arranging the two or more openings 220 in a shape of an asterism (250 and 255) or constellation 405; and forming a plurality of path segments 210 between different pairs of openings 220 to thereby define a frame of the asterism (250 and 255) or constellation 405.

In some examples of the method, forming the path segment 210 involves forming the path segment 210 on the surface 206 of the substrate 205 from a mixture that comprises strontium aluminate and an adhesive.

In some examples of the method, forming the path segment 210 involves forming the path segment 210 on the surface 206 of the substrate 205 from a mixture that comprises strontium aluminate, an adhesive, and a dopant.

In some examples of the method, overlaying the path segment 210 involves facilitating the charging of the photoluminescent material under the ambient photopic condition.

In some examples of the method, forming the path segment 210 on the surface 206 of the substrate 205 involves forming the path segment 210 on a face of a substrate 205 that includes a honeycomb core.

In some examples of the method, forming the path segment 210 on the surface 206 of the substrate 205 involves forming the path segment 210 on a surface of a polyvinyl fluoride (PVF) film.

In some examples of the method, forming the path segment 210 on the surface 206 of the substrate 205 involves depositing the photoluminescent material on the surface 206 of the substrate 205

Figure 8:
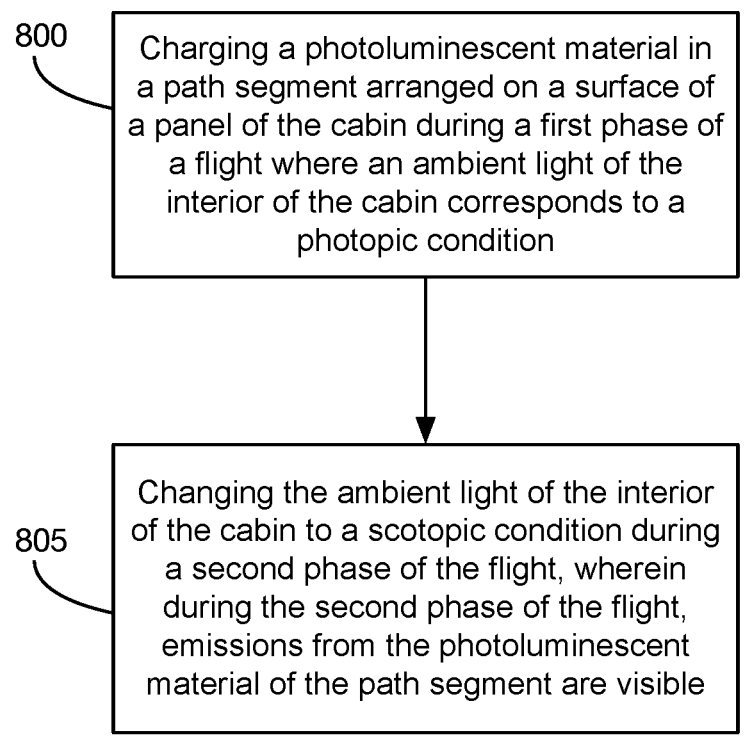
FIG. 8 illustrates a method for illuminating an interior of a cabin of an aircraft, in accordance with an example.
Figure 9A:
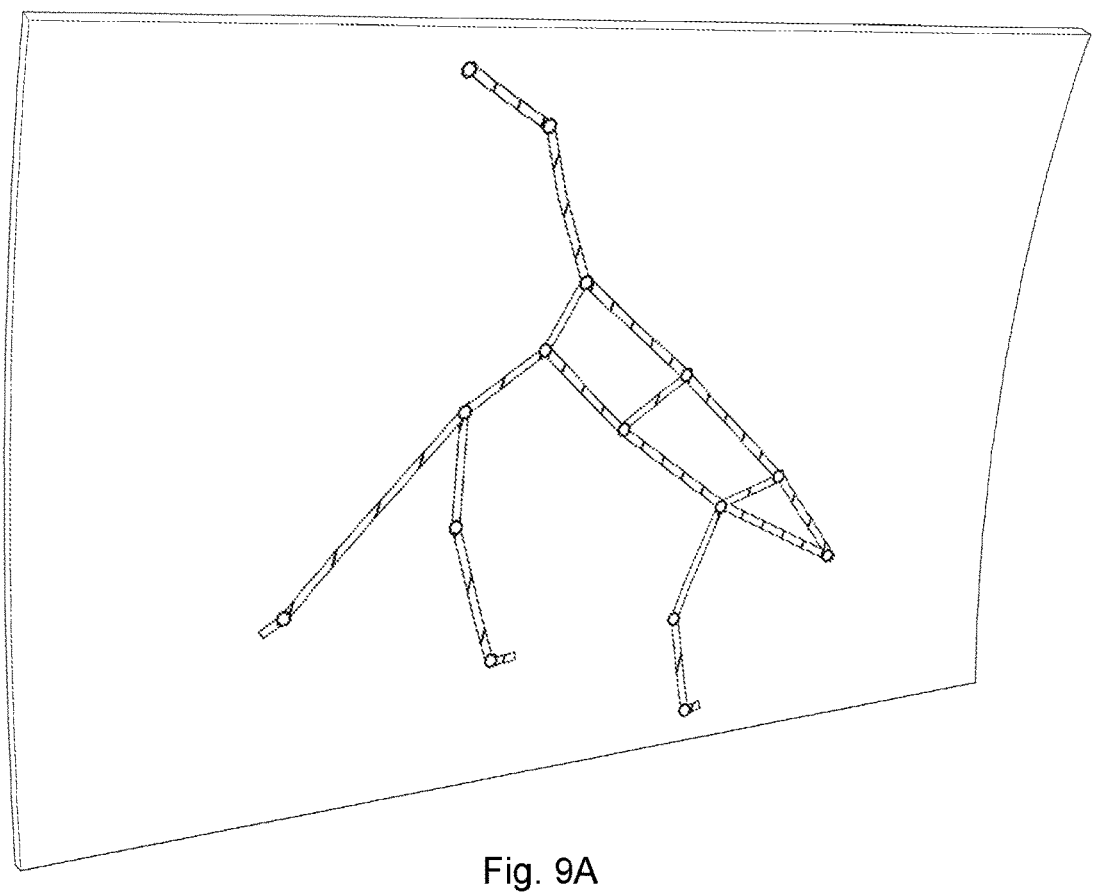
FIG. 9A illustrates a perspective view of panel having illuminated path segments arranged to depict the constellation Ursa Major, in accordance with an example.
Figure 9B:
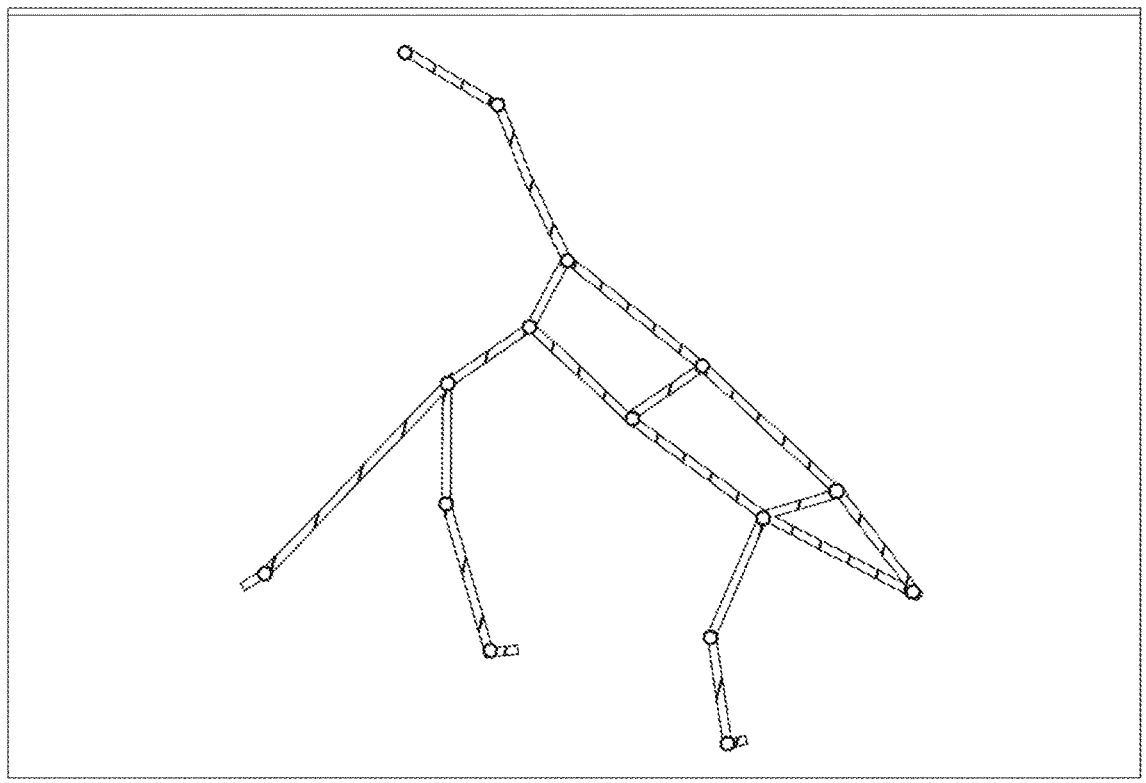
FIG. 9B illustrates a front view thereof.
Figure 9C:
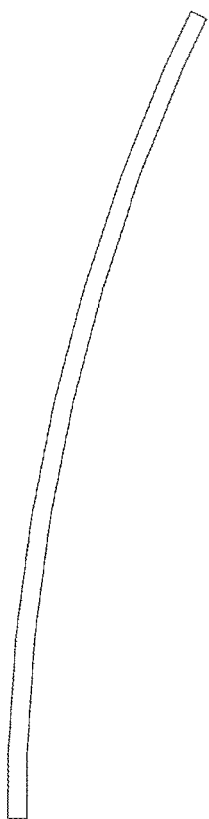
FIG. 9C illustrates a left-side view thereof.
Figure 9D:
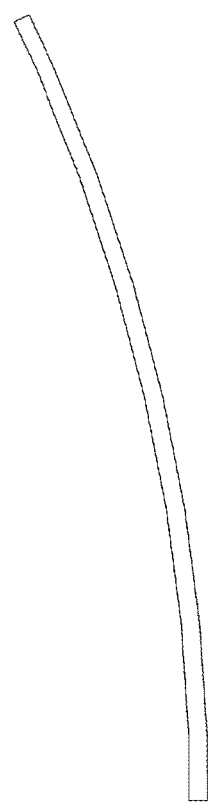
FIG. 9D illustrates a right-side view thereof.
Figure 9E:
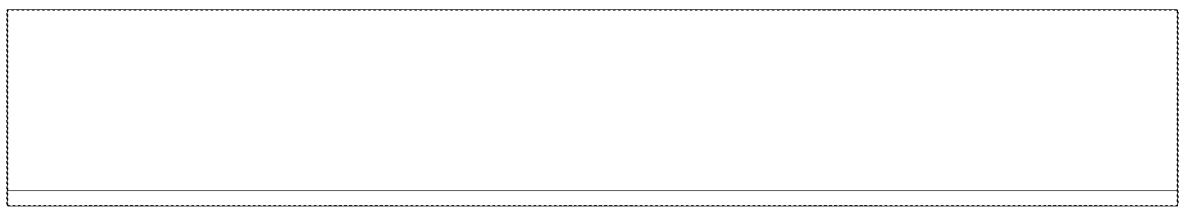
FIG. 9E illustrates a top view thereof.
Figure 9F:
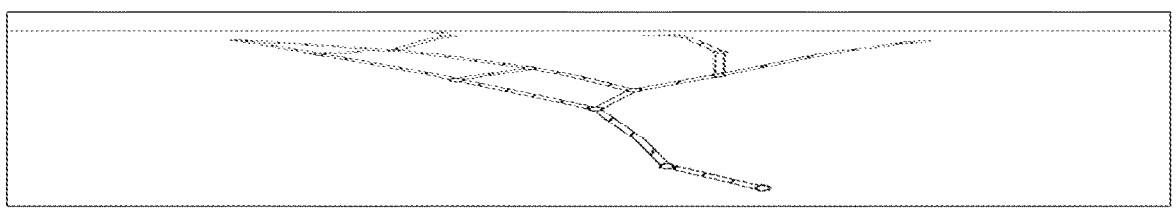
FIG. 9F illustrates a bottom view thereof.
Figure 10A:
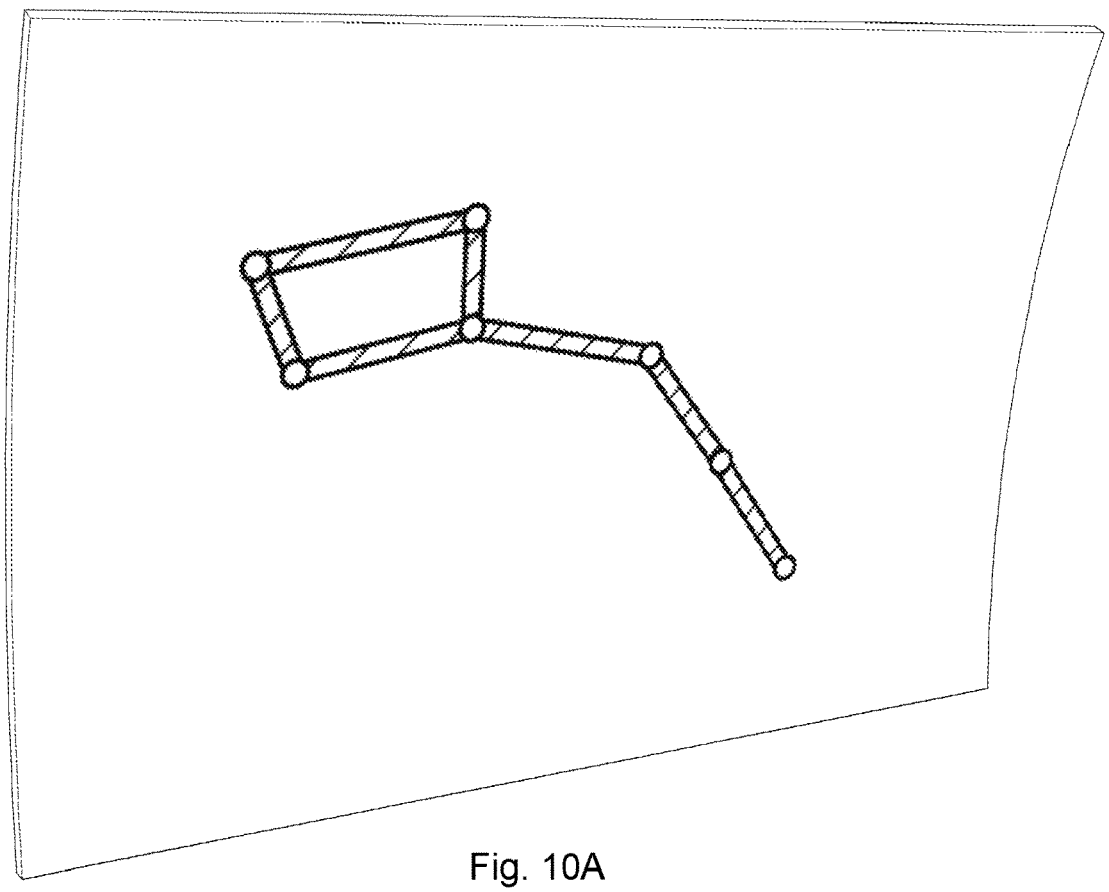
FIG. 10A illustrates a perspective view of panel having illuminated path segments arranged to depict the asterism Little Dipper, in accordance with an example.
Figure 10B:
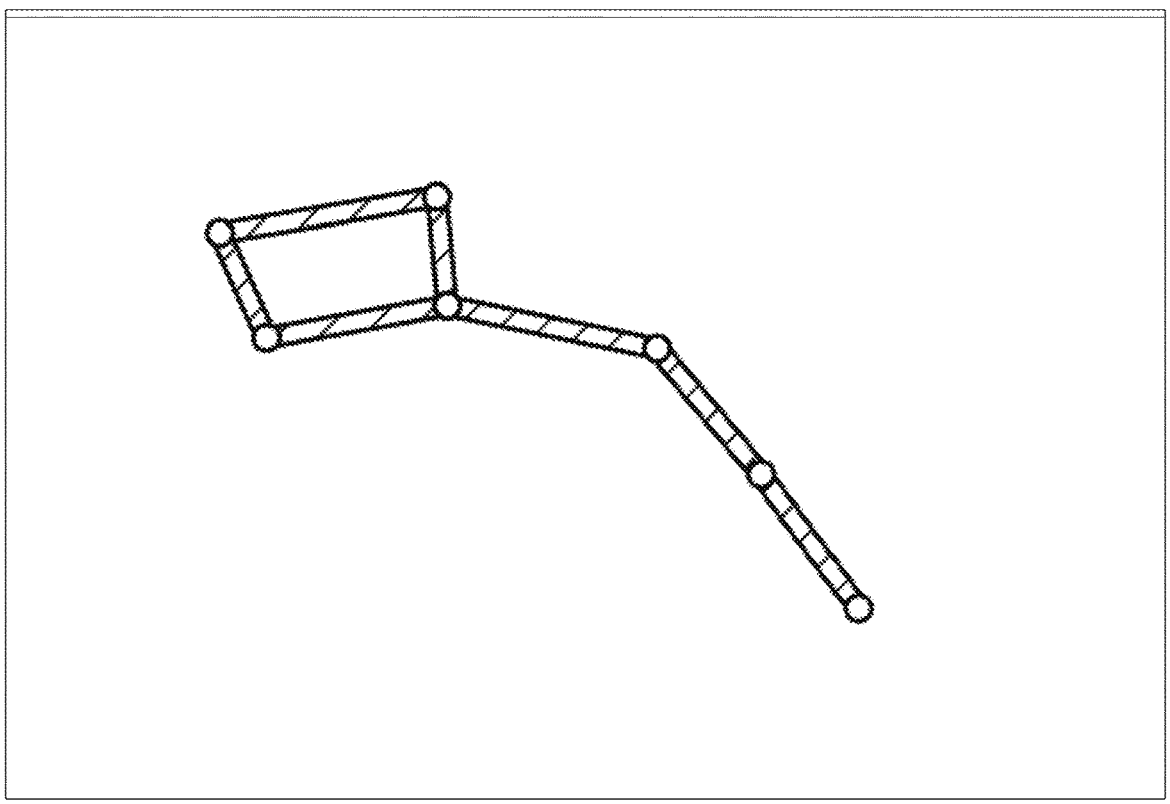
FIG. 10B illustrates a front view thereof.
Figure 10E:
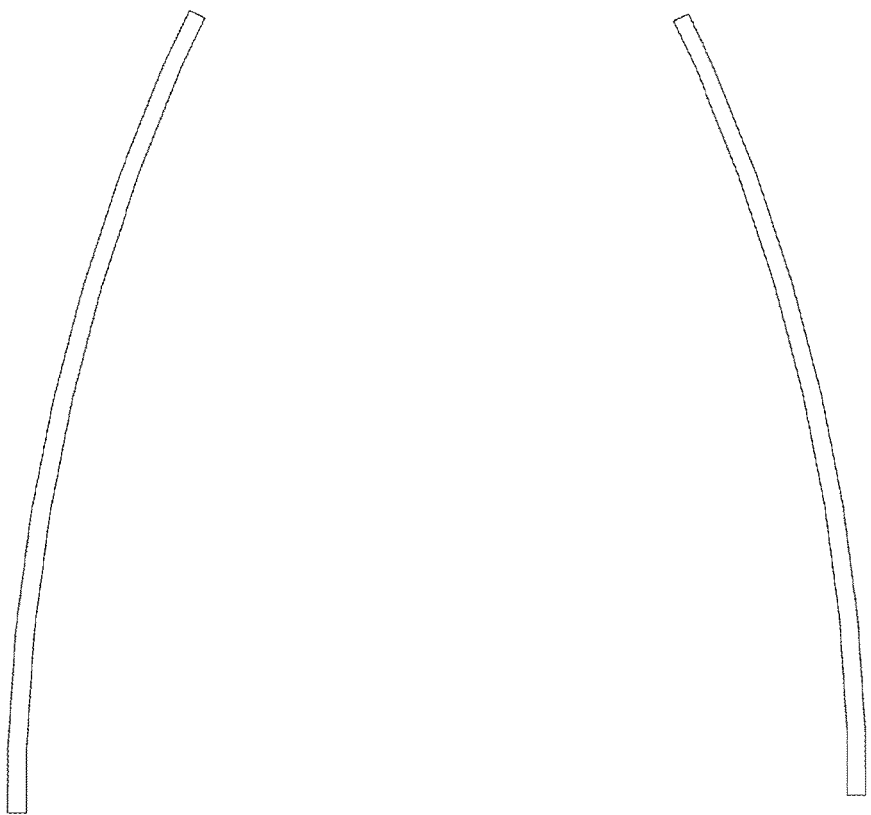
FIG. 10E illustrates atop view thereof.
Figure 10E:
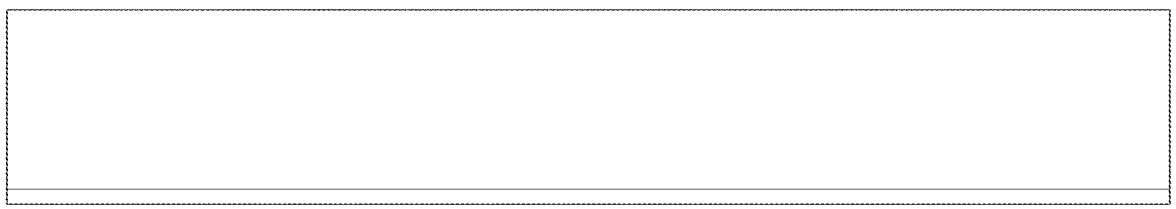
Figure 10F:
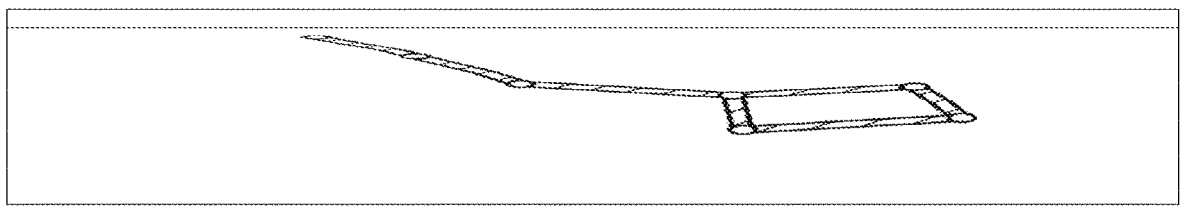
FIG. 10F illustrates a bottom view thereof.
Figure 11A:
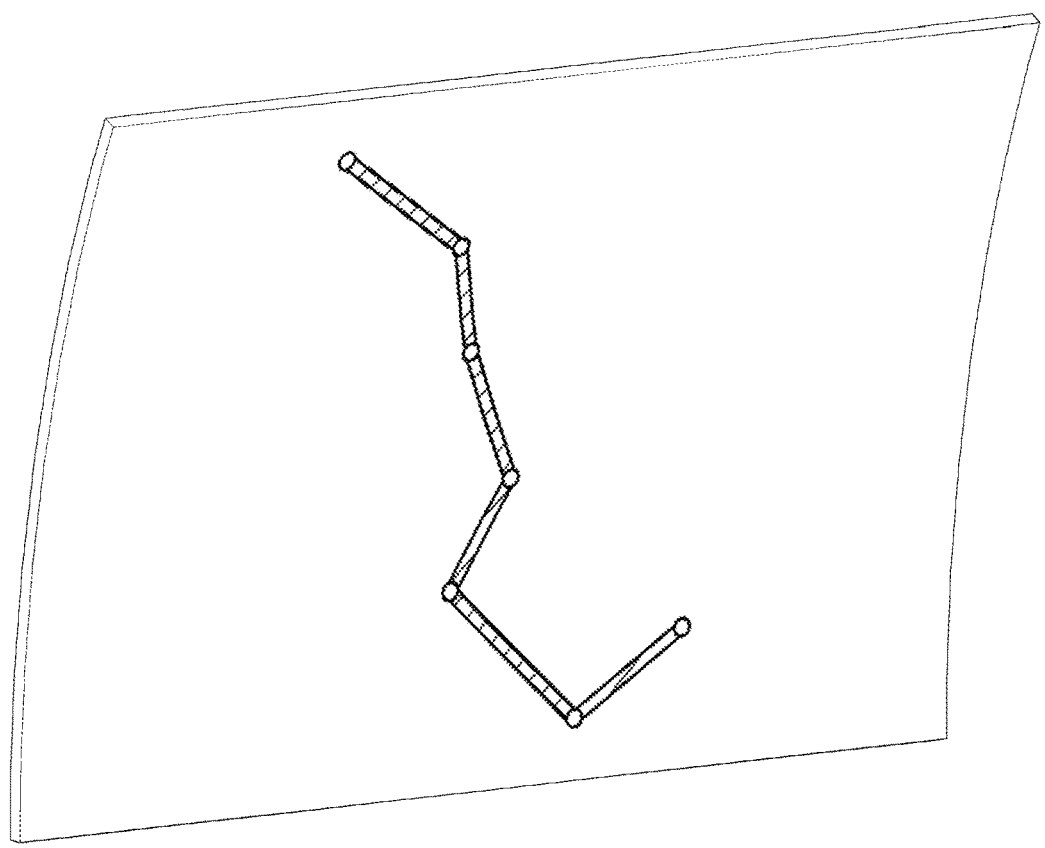
FIG. 11A illustrates a perspective view of panel having illuminated path segments arranged to depict the asterism Big Dipper, in accordance with an example.
Figure 11B:
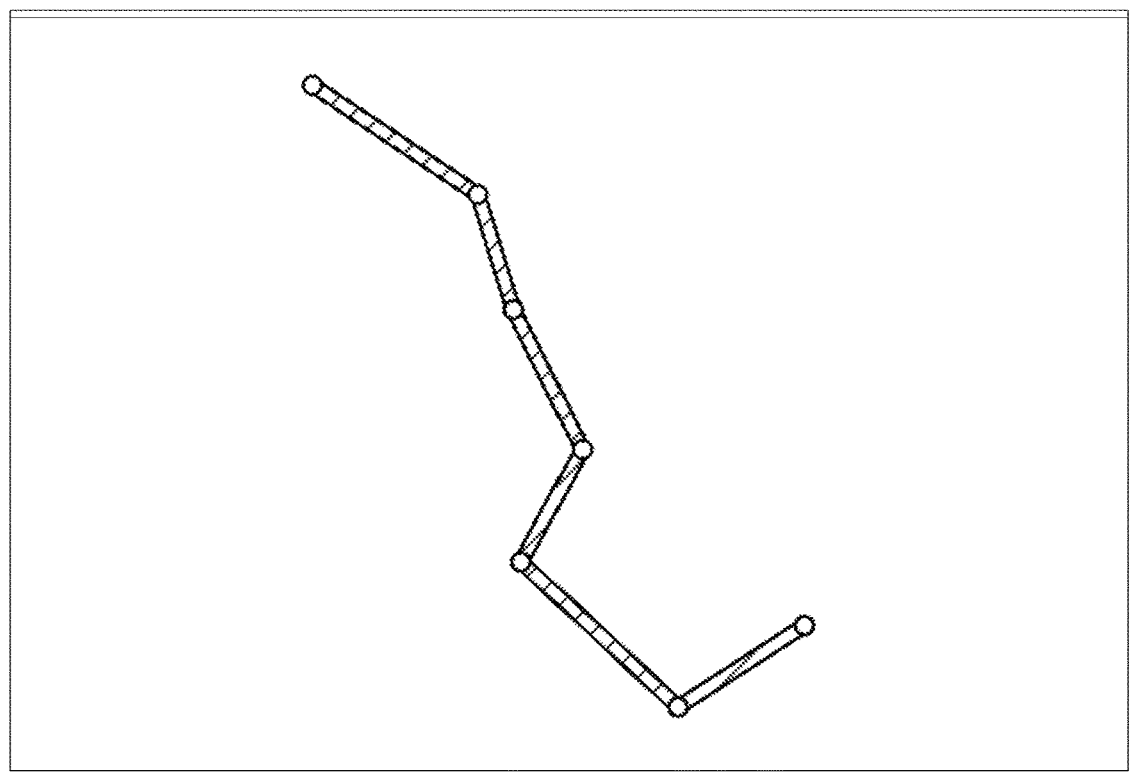
FIG. 11B illustrates a front view thereof.
Figure 11C:
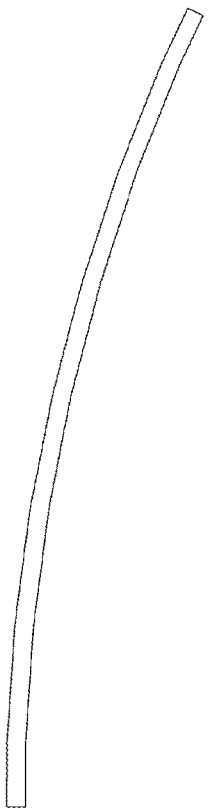
FIG. 11C illustrates a left-side view thereof.
Figure 11D:
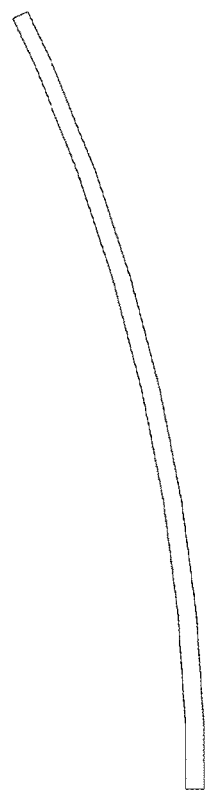
FIG. 11D illustrates a right-side view thereof.
Figure 11E:
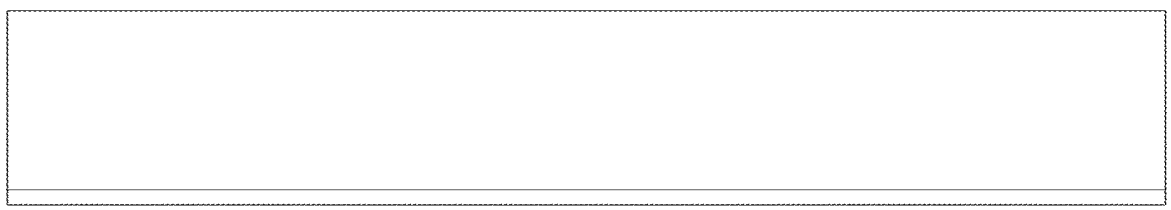
FIG. 11E illustrates a top view thereof.
Figure 11F:
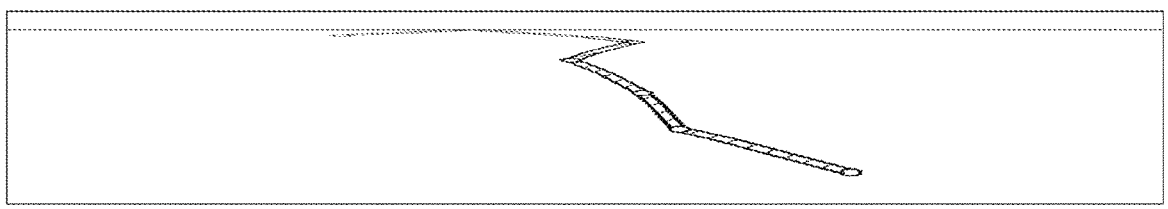
FIG. 11F illustrates a bottom view thereof.

FIG. 8 illustrates a method for illuminating an interior of a cabin of an aircraft 100. Block 800 involves charging a photoluminescent material in a path segment 210 arranged on a surface of a panel 105 of the cabin during a first phase of a flight where an ambient light of the interior of the cabin corresponds to a photopic condition.

Block 805 involves changing the ambient light of the interior of the cabin to a mesopic or scotopic condition during a second phase of the flight, wherein during the second phase of the flight, emissions from the photoluminescent material of the path segment 210 are visible.

An example of the method can involve maintaining the ambient light of the interior of the cabin at the photopic condition so that the path segment 210 is rendered substantially invisible during the first phase of the flight.

An example of the method can involve rendering a frame of an asterism (250 and 255) or constellation 405 on the panel 105 visible during the second phase of the flight, wherein the frame of the asterism (250 and 255) is defined by a plurality of path segments 210 that include the photoluminescent material, and that extend between different pairs of a plurality of openings 220 on the panel 105.

In some examples of the method, rendering the frame of the asterism (250 and 255) or the constellation 405 can involve illuminating an illumination device 305 arranged proximate to the plurality of openings 220.

FIGS. 9A-11F illustrate various views of example panels having illuminated path segments 210 arranged to depict various shapes. The shape depicted on the example panel of FIGS. 9A-9F corresponds to the constellation Ursa Major. The shape depicted on the example panel of FIGS. 10A-10F corresponds to the asterism Little Dipper. The shape depicted on the example panel of FIGS. 11A-11F corresponds to the Big Dipper.

The path segments can be arranged on the panels differently. For example, the various shapes can be scaled, rotated, and/or offset to cover different areas of the respective panels. The shapes can be repeated on the respective panels. A combination of the shapes depicted on the various panels can be depicted on the same panel.

Moreover, the path segments can be arranged to show an entirely different shape. For example, path segments can be arranged to depict a combination of one or more of the internationally recognized constellations Aquarius, Aquila, Aries, Canis Major, Cassiopeia, Cygnus, Gemini, Leo, Lyra, Ursa minor, Wheat of Virgo, and Orion. Other internationally recognized constellations can be depicted. The path segments can be arranged to depict a combination of one or more of the regionally recognized constellations Ke Ka o Makali'i ("The Canoe-Bailer of Makali'i"), Iwikuamo'o ("Backbone"), Manaiakalani ("The Chief s Fishline"), and Ka Lupe o Kawelo ("The Kite of Kawelo"). Other constellations regionally recognized in different parts of the world can be depicted.

Further, the disclosure comprises embodiments according to the following clauses:

Clause 1. A method for manufacturing a panel, the method comprising: forming a path segment on a surface of a substrate from a photoluminescent material; and overlaying the path segment with an overlay material, wherein the overlay material is configured to render the path segment substantially invisible under an ambient photopic condition and render the path segment visible under an ambient mesopic or scotopic condition.

Clause 2. The method according to clause 1, further comprising: forming two or more openings in the substrate, wherein the path segment linearly extends between a pair of the two or more openings; and arranging one or more illumination devices in proximity to the two or more openings to illuminate endpoints of the path segment.

Clause 3. The method according to any of the proceeding clauses, wherein arranging one or more illumination devices comprises arranging a fiber optic cable in proximity to the two or more openings.

Clause 4. The method according to any of the proceeding clauses, wherein arranging one or more illumination devices comprises arranging a light-emitting diode (LED) in proximity to the two or more openings.

Clause 5. The method according to any of the proceeding clauses, further comprising: arranging the two or more openings in a shape of an asterism or constellation; and forming a plurality of path segments between different pairs of openings to thereby define a frame of the asterism or constellation.

Clause 6. The method according to any of the proceeding clauses, wherein forming the path segment comprises forming the path segment on the surface of the substrate from a mixture that comprises strontium aluminate and an adhesive.

Clause 7. The method according to any of the proceeding clauses, wherein forming the path segment comprises forming the path segment on the surface of the substrate from a mixture that comprises strontium aluminate, an adhesive, and a dopant.

Clause 8. The method according to any of the proceeding clauses, wherein overlaying the path segment comprises facilitating charging of the photoluminescent material under the ambient photopic condition.

Clause 9. The method according to any of the proceeding clauses, wherein forming the path segment on the surface of the substrate comprises forming the path segment on a face of a substrate that includes a honeycomb core.

Clause 10. The method according to any of the proceeding clauses, wherein forming the path segment on the surface of the substrate comprises forming the path segment on a surface of a polyvinyl fluoride (PVF) film.

Clause 11. The method according to any of the proceeding clauses, wherein forming the path segment comprises: depositing the photoluminescent material on the surface of the substrate.

Clause 12. A panel for an interior cabin of an aircraft, the panel comprising: a substrate; a path segment arranged on a surface of the substrate, the path segment formed from a photoluminescent material; and an overlay material arranged on the path segment, wherein the overlay material is configured to render the path segment substantially invisible under an ambient photopic condition and render the path segment visible under an ambient mesopic or scotopic condition.

Clause 13. The panel according to clause 12, further comprising: two or more openings formed in the substrate, wherein the path segment corresponds to a linearly that extends between a pair of the two or more openings; and one or more illumination devices arranged in proximity to the two or more openings to illuminate endpoints of the path segment.

Clause 14. The panel according to any of the preceding clauses starting from clause 12, wherein at least some of the one or more illumination devices correspond to a fiber optic cable.

Clause 15. The panel according to any of the preceding clauses starting from clause 12, wherein at least some of the one or more illumination devices correspond to a light-emitting diode (LED).

Clause 16. The panel according to any of the preceding clauses starting from clause 12, wherein the two or more openings are arranged to define a shape of an asterism or a constellation, wherein the panel further comprises a plurality of path segments, formed from the photoluminescent material, between different pairs of openings to thereby form a frame of the asterism or the constellation.

Clause 17. The panel according to any of the preceding clauses starting from clause 12, wherein the photoluminescent material comprises a mixture of strontium aluminate and an adhesive.

Clause 18. A vehicle that corresponds to an aircraft comprising: a plurality of panels configured for attachment to an interior of a fuselage, wherein at least one panel of the plurality of panels comprises: a substrate having a surface; a path segment arranged on the surface of the substrate, the path segment formed from a photoluminescent material; and an overlay material arranged on the path segment, wherein the overlay material is configured to render the path segment substantially invisible under an ambient photopic condition and render the path segment visible under an ambient mesopic or scotopic condition.

Clause 19. A vehicle that corresponds to a bus comprising: a plurality of panels configured for attachment to an interior of the bus, wherein at least one panel of the plurality of panels comprises: a substrate having a surface; a path segment arranged on the surface of the substrate, the path segment formed from a photoluminescent material; and an overlay material arranged on the path segment, wherein the overlay material is configured to render the path segment substantially invisible under an ambient photopic condition and render the path segment visible under an ambient mesopic or scotopic condition.

Clause 20. A vehicle that corresponds to a train comprising: a plurality of panels configured for attachment to an interior of the train, wherein at least one panel of the plurality of panels comprises: a substrate having a surface; a path segment arranged on the surface of the substrate, the path segment formed from a photoluminescent material; and an overlay material arranged on the path segment, wherein the overlay material is configured to render the path segment substantially invisible under an ambient photopic condition and render the path segment visible under an ambient mesopic or scotopic condition.

Clause 21. A vehicle that corresponds to an automobile comprising: a plurality of panels configured for attachment to an interior of the automobile, wherein at least one panel of the plurality of panels comprises: a substrate having a surface; a path segment arranged on the surface of the substrate, the path segment formed from a photoluminescent material; and an overlay material arranged on the path segment, wherein the overlay material is configured to render the path segment substantially invisible under an ambient photopic condition and render the path segment visible under an ambient mesopic or scotopic condition.

Clause 24. The vehicle according to the any of preceding clauses from clause 18, further comprising: two or more openings formed in the substrate, wherein the path segment corresponds to a linearly that extends between a pair of the two or more openings; and one or more illumination devices arranged in proximity to the two or more openings to illuminate endpoints of the path segment.

Clause 25. The vehicle according to the any of preceding clauses from clause 18, wherein at least some of the one or more illumination devices correspond to a fiber optic cable.

Clause 26. The vehicle according to the any of preceding clauses from clause 18, wherein at least some of the one or more illumination devices correspond to a light-emitting diode (LED).

Clause 27. The vehicle according to the any of preceding clauses from clause 18, wherein the two or more openings are arranged to define a shape of an asterism or a constellation, wherein the panel further comprises a plurality of path segments, formed from the photoluminescent material, between different pairs of openings to thereby form a frame of the asterism or the constellation.

Clause 28. The vehicle according to the any of preceding clauses from clause 18, wherein the photoluminescent material comprises a mixture of strontium aluminate and an adhesive.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular example disclosed, but that the disclosed methods and systems include all embodiments falling within the scope of the appended claims.

What is claimed is:

1. A method for manufacturing a panel, the method comprising:
    forming a path segment on a surface of a substrate having a particular color from a photoluminescent material having a particular color under an ambient photopic condition that is different from the color of the substrate; and
    overlaying the path segment with an overlay material, wherein the overlay material has a color that when combined with the color of the photoluminescent material is configured to match the color of the substrate so that the path segment becomes substantially invisible under an ambient photopic condition and wherein the overlay material is configured to render the path segment visible under an ambient mesopic or scotopic condition.

2. The method according to claim 1, further comprising:
    forming two or more openings in the substrate, wherein the path segment linearly extends between a pair of the two or more openings; and
    arranging one or more illumination devices in proximity to the two or more openings to illuminate endpoints of the path segment.

3. The method according to claim 2, wherein arranging one or more illumination devices comprises arranging a fiber optic cable in proximity to the two or more openings.

4. The method according to claim 2, wherein arranging one or more illumination devices comprises arranging a light-emitting diode (LED) in proximity to the two or more openings.

5. The method according to claim 2, further comprising:
    arranging the two or more openings in a shape of an asterism or constellation; and
    forming a plurality of path segments between different pairs of openings to thereby define a frame of the asterism or constellation.

6. The method according to claim 1, wherein forming the path segment comprises forming the path segment on the surface of the substrate from a mixture that comprises strontium aluminate and an adhesive.

7. The method according to claim 1, wherein forming the path segment comprises forming the path segment on the surface of the substrate from a mixture that comprises strontium aluminate, an adhesive, and a dopant.

8. The method according to claim 1, wherein overlaying the path segment comprises facilitating charging of the photoluminescent material under the ambient photopic condition.

9. The method according to claim 1, wherein forming the path segment on the surface of the substrate comprises forming the path segment on a face of a substrate that includes a honeycomb core.

10. The method according to claim 1, wherein forming the path segment on the surface of the substrate comprises forming the path segment on a surface of a polyvinyl fluoride (PVF) film.

11. The method according to claim 1, wherein forming the path segment comprises:
    depositing the photoluminescent material on the surface of the substrate.

12. A panel for an interior cabin of an aircraft, the panel comprising:
    a substrate having a particular color;
    a path segment arranged on a surface of the substrate, the path segment formed from a photoluminescent material having a particular color under an ambient photopic condition that is different from the color of the substrate; and an overlay material arranged on the path segment, wherein the overlay material has a color that when combined with the color of the photoluminescent material is configured to match the color of the substrate so that the path segment becomes substantially invisible under an ambient photopic condition and wherein the overlay material is configured to render the path segment visible under an ambient mesopic or scotopic condition.

13. The panel according to claim 12, further comprising:
two or more openings formed in the substrate, wherein the path segment corresponds to a linearly that extends between a pair of the two or more openings; and
one or more illumination devices arranged in proximity to the two or more openings to illuminate endpoints of the path segment.

14. The panel according to claim 13, wherein at least some of the one or more illumination devices correspond to a fiber optic cable.

15. The panel according to claim 13, wherein at least some of the one or more illumination devices correspond to a light-emitting diode (LED).

16. The panel according to claim 13, wherein the two or more openings are arranged to define a shape of an asterism or a constellation, wherein the panel further comprises a plurality of path segments, formed from the photoluminescent material, between different pairs of openings to thereby form a frame of the asterism or the constellation.

17. The panel according to claim 12, wherein the photoluminescent material comprises a mixture of strontium aluminate and an adhesive.

18. An aircraft comprising:
a plurality of panels configured for attachment to an interior of a fuselage, wherein at least one panel of the plurality of panels comprises:
a substrate having a surface having a particular color;
a path segment arranged on the surface of the substrate, the path segment formed from a photoluminescent material having a particular color under an ambient photopic condition that is different from the color of the substrate; and
an overlay material arranged on the path segment, wherein the overlay material has a color that when combined with the color of the photoluminescent material is configured to match the color of the substrate so that the path segment becomes substantially invisible under an ambient photopic condition and wherein the overlay material is configured to render the path segment visible under an ambient mesopic or scotopic condition.

19. The aircraft according to claim 18, wherein the at least one panel further comprises:
a plurality of openings arranged to define a shape of an asterism or constellation; and
a plurality of path segments, wherein the plurality of path segments extend between different pairs of the plurality of openings to thereby form a frame of the asterism or the constellation.

20. The aircraft according to claim 19, wherein the at least one panel further comprises:
an illumination device arranged in proximity to the plurality of openings to illuminate endpoints of the plurality of path segments.

\* \* \* \* \*